E. W. BOWEN.
VALVE FOR INTERNAL COMBUSTION ENGINES.
APPLICATION FILED NOV. 25, 1911.
1,040,612.
Patented Oct. 8, 1912.
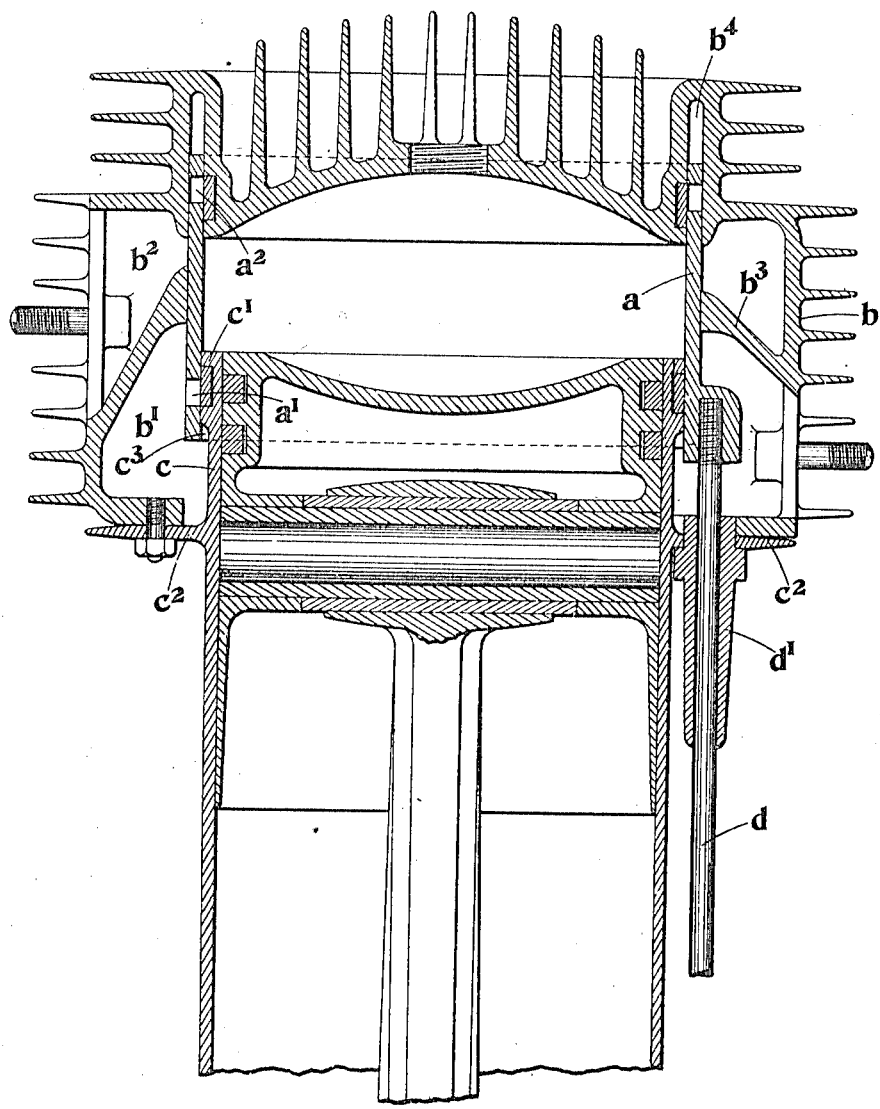
Witnesses—
Stanley Wood
Lionel Ernest Bussey.
Inventor
Ernest Windsor Bowen
by
W. E. Evans
Attorney.

UNITED STATES PATENT OFFICE.

ERNEST WINDSOR BOWEN, OF LONDON, ENGLAND.

VALVE FOR INTERNAL-COMBUSTION ENGINES.

1,040,612.  Specification of Letters Patent.  Patented Oct. 8, 1912.

Application filed November 25, 1911. Serial No. 662,371.

*To all whom it may concern:*

Be it known that I, ERNEST WINDSOR BOWEN, consulting engineer, a subject of the King of Great Britain and Ireland, residing at 1 Albemarle street, London, W., England, have invented certain new and useful Improvements in Valves for Internal-Combustion Engines, of which the following is a specification.

This invention relates to internal combustion engines and has for its object to provide simple means for the admission of the explosive mixture to the cylinder and the control of the exhaust therefrom.

According to the invention I provide a reciprocating sleeve valve which is carried within a removable cylinder head inclosing the end of the wall of the cylinder and reciprocates upon bearing surfaces formed respectively upon the exterior of the end of the cylinder wall and in the cylinder head so as to bridge the space between the said surfaces, through which space the admission to and exhaust from the cylinder are effected. The valve is provided with separate admission and exhaust ports and is operated from the crank shaft.

According to the invention also means are provided for the effective lubrication of the sleeve valve.

The invention is illustrated by way of example in the accompanying drawings in which the figure represents in cross section a cylinder of a revolving cylinder engine.

According to the particular construction shown in the drawing an outwardly projecting flange $c^2$ is provided at a determined distance from the extremity of the wall $c$ of the cylinder upon which flange the cylinder head $b$ is mounted and the extremity of the wall of the cylinder is thickened at the exterior to form a seating $c^1$ for packing rings and a contact face for the interior of the sleeve valve $a$. The head $b$ comprises a hollow cylindrical fitting of substantially greater diameter than the cylinder adapted to be secured upon the flange $c^2$ referred to so as to inclose the extremity of the cylinder wall. The cylindrical fitting is provided with a partition $b^3$ which serves to divide the space within the cylinder head around the cylinder wall into two circumferential belts $b^1$, $b^2$, the partition being so disposed and arranged that the said belts can both communicate with the interior of the cylinder and that the inner edge of the partition serves as a bearing face for the exterior of the sleeve valve $a$. At the outer end of the cylinder head there is provided an annular recess $b^4$ which serves to receive and guide the outer extremity of the sleeve valve and which is advantageously packed on the inner side of the valve.

The valve $a$ consists of a cylindrical member provided with two ports or series of ports $a^1$, $a^2$, adapted to register respectively with the admission and exhaust belts $b^1$, $b^2$ and to put them into communication with the interior of the cylinder when necessary. The valve is advantageously reciprocated by means of a rod $d$ secured to a lug provided upon its exterior surface, which rod passes through a stuffing box $d^1$ mounted in the cylinder flange and receives movement from cams, eccentrics or other suitable means driven by chain gear, spur gear or other suitable transmission devices from the crank shaft.

In the application of the valve according to the invention to an internal-combustion engine of the fixed cylinder type, the admission and exhaust belts may be conveniently disposed at one side only or on opposite sides of the cylinder and thus would not necessitate any increase in the overall dimensions of the engine.

The enlarged portion of the wall of the cylinder at $c^1$ upon which the valve reciprocates is preferably so formed that the inner end of the valve at all points in its travel projects always beyond the inner end of the said enlarged portion of the cylinder wall, and there is, therefore, an annular space $c^3$ into which the oil carried into the valve chamber tends to pass and so keep the contacting surface of the sleeve valve and cylinder wall constantly lubricated. This tendency is assisted by centrifugal force in the case of engines with revolving cylinders.

It will be understood that valves according to the invention may be applied with advantage to all types of internal-combustion engines.

What I claim as my invention and desire to secure by Letters Patent is:—

1. The combination with an open-ended cylinder of an internal combustion engine, of a removable cylinder head inclosing the open end of the cylinder and having admission and exhaust ports, such ports communicating with the cylinder, a partition in said removable cylinder head dividing it to form an admission belt and an exhaust belt, and means for controlling said ports, said means being inclosed within the removable cylinder head and operating around the open cylinder end.

2. The combination with an open-ended cylinder of an internal combustion engine, of a removable cylinder head inclosing the open end of the cylinder and having admission and exhaust ports, such ports communicating with the cylinder, a partition in said removable cylinder head dividing it to form an admission belt and an exhaust belt, a sleeve valve inclosed within the removable cylinder head and encircling the open end of the cylinder, said sleeve valve controlling the admission and exhaust ports and means for operating said valve.

In testimony whereof I have hereunto signed my name to this specification, in the presence of two subscribing witnesses.

ERNEST WINDSOR BOWEN.

Witnesses:
LIONEL ERNEST BUSSEY,
JOHN THOMAS BUSH.